Figure 6:
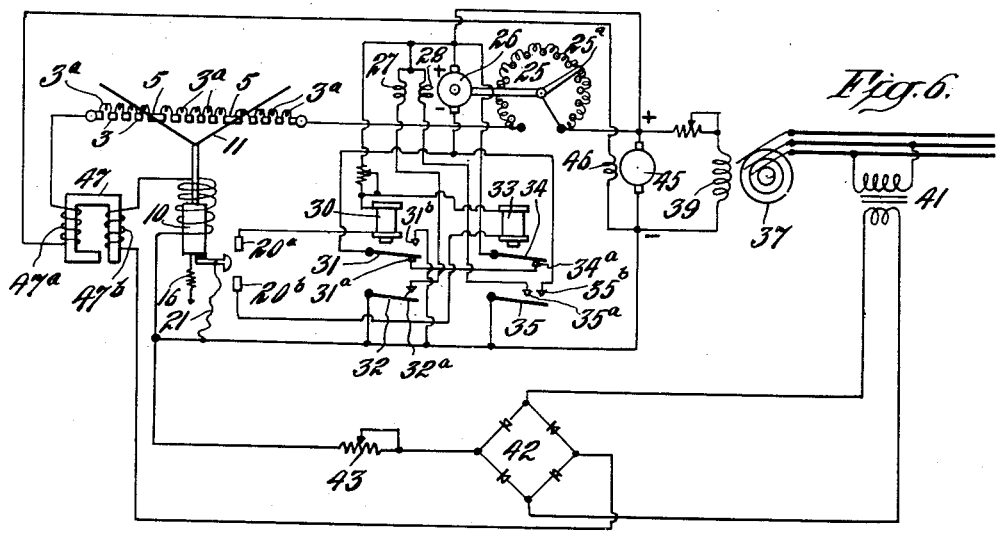

Jan. 6, 1942.　　　　F. G. LOGAN　　　　2,268,756
ELECTRIC CONTROLLING APPARATUS
Filed Jan. 24, 1939　　　3 Sheets-Sheet 1
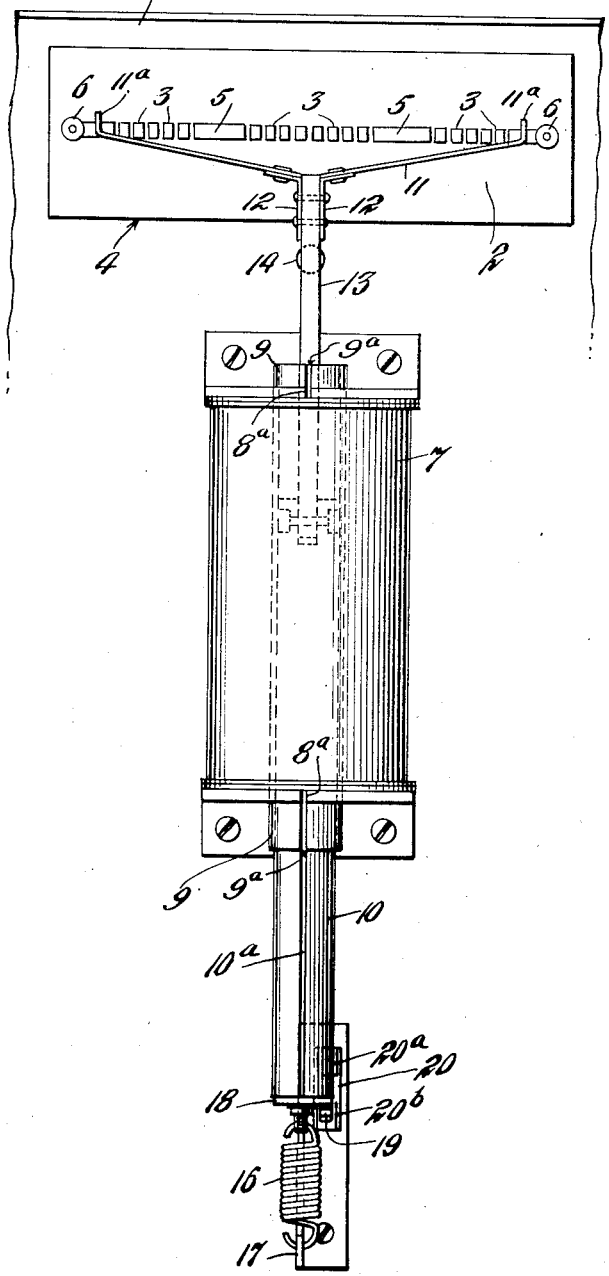
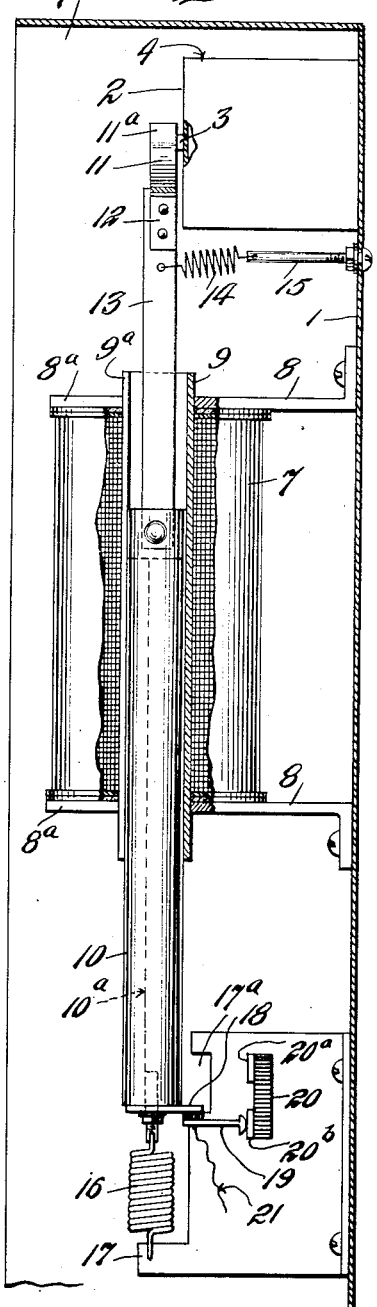
INVENTOR
FRANK G. LOGAN
BY
Lawrence K. Sager
his ATTORNEY

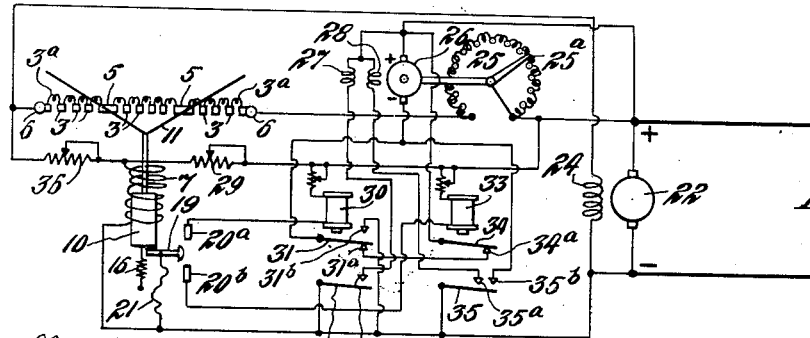

Jan. 6, 1942.                F. G. LOGAN                 2,268,756
                    ELECTRIC CONTROLLING APPARATUS
                       Filed Jan. 24, 1939           3 Sheets-Sheet 3

INVENTOR
FRANK G. LOGAN
BY Lawrence K. Sager
his ATTORNEY

Patented Jan. 6, 1942

2,268,756

UNITED STATES PATENT OFFICE 2,268,756

ELECTRIC CONTROLLING APPARATUS

Frank G. Logan, Mount Vernon, N. Y., assignor to Ward Leonard Electric Company, a corporation of New York Application January 24, 1939, Serial No. 252,583

9 Claims. (Cl. 171—229)

This invention relates to improved means and methods of control for regulating the voltage of dynamoelectric machines, particularly where the machine to be regulated is of large capacity and where the field strength is controlled by a motor driven rheostat.

In my pending application Serial No. 251,468, filed January 18, 1939, I have described and claimed an improved form of regulating apparatus. The present application is an improvement thereon with particular reference to the regulation of machines of large capacity.

Where a motor driven rheostat is used, the regulation is poor by reason of the slow action of the motor in response to a change of voltage. In order to overcome this defect, resorts have been had to the use of relays which automatically insert and remove from the controlling field circuit blocks of resistance of large amounts which are sufficient to more than offset the change of voltage and cause the motor which operates the field rheostat to operate in one direction or the other for the purpose of gradually inserting or removing resistance from the controlling field circuit and to adjust the same to a proper amount for maintaining the desired voltage. The main objection to such apparatus is that the change imposed by the relays controlling the blocks of resistance is so great that there occurs an excessive over-correction of the voltage before the motor driven rheostat has had an opportunity to move into a proper adjusted position. The result is that the control of the voltage is irregular and lacking in smoothness of control and causes the relays to be almost continuously opening and closing in the effort to obtain proper regulation.

The main object of the present invention is to provide apparatus which will secure prompt correction of the departure from normal voltage and secure smoothness of control for large capacity machines where a motor driven regulating rheostat is utilized. Another object is to avoid the almost continuous chattering of relays due to their constant opening and closing of resistance circuits affecting the amount of resistance inserted in the controlling field circuit. Another object is to provide a simple form of construction which will be dependable in operation, rugged, and compact in structure and adapted to withstand severe service with a minimum amount of attention. Another object is to provide a structure which will apply a corrective factor quickly when needed to overcome any sudden change of conditions, the amount of correction being graduated according to the degree of departure of the voltage from normal. Another object is to permit the movable parts to remain at rest, except at such times as response is necessary for correction of the voltage and thereby avoid the irregularities due to continuous regulating activity required in various prior forms of regulators. Another object is to avoid the use of mechanical dampers with their resultant sluggish action. In the present invention, the main actuating regulator is permitted to respond freely to the initial impulse and momentarily overcorrect by applying a rapid corrective factor and is then brought quickly to its proper controlling position by use of an electrical anti-hunting impulse. Other objects and advantages of the invention will be understood from the following description and accompanying drawings showing preferred embodiments of the invention.

Figure 7:
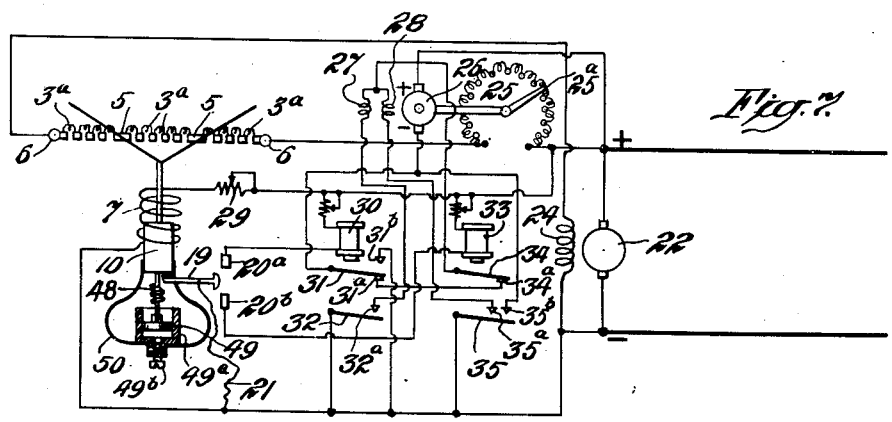

Fig. 1 is a front elevation of the controlling device which initially responds to a departure from normal conditions; Fig. 2 is a side view thereof partly in section; Fig. 3 is a diagram showing the parts and connections of the complete regulating apparatus; Figs. 4 and 5 are similar diagrams showing modifications and different applications of the invention; Fig. 6 is similar to Fig. 5 except it shows a different form of anti-hunting means; and Fig. 7 is similar to Fig. 3 except a different form of anti-hunting means is shown.

Referring to Figs. 1 and 2, the controlling parts are enclosed by and mounted on the back of a casing 1. The main regulating resistance controller is shown as having a front panel or plate 2 on which is mounted a horizontal row of contacts 3 between which the resistive elements are connected in sequence and enclosed within the box 4 at the rear of the face plate. These resistive elements may be suitably supported within the box 4 and arranged for dissipation of the heat therefrom where the units are of particularly large capacity, or they may be mounted on the plate 2 and insulated therefrom, as in the usual form of plate rheostats. The contacts 3 on the face of the plate are arranged in central and end groups as shown in Fig. 1, with the elongated contacts 5 between the groups. At the ends are mounted terminals 6 for connection to the field circuit to be controlled.

Below this main resistive device is mounted an electromagnet or solenoid having a vertical coil 7 with supporting brackets 8 of sheet metal at the upper and lower ends which are secured in turn to the back of the casing 1. The solenoid coil is wound upon a brass tube 9 to which the brackets 8 are fixed. The tube projects above and below the controlling coil and serves to guide the movable element or plunger 10 of magnetic material. The tube is slotted throughout its length in a vertical direction, as shown at 9a, for the purpose of reducing eddy currents; and the supporting brackets 8 are likewise slotted as shown at 8a, for the same purpose.

The movable element 11 which contacts with the faces of the contacts 3 and 5, is in the form of a metal strip, the inner edge of which contacts with the fixed contacts. The element 11 is of a widely open V-form with the ends 11a extending upward vertically. It is preferably made of silver or alloy of silver for insuring good contact but may, if desired, be made of a baser metal with the contacting portion of silver or alloy of silver. At the central base of the contacting element 11 are secured brackets 12 which engage the opposite sides of a connecting strip 13 of insulating material. This strip extends downwardly into the coil 7 and is pivotally connected to the upper end of the plunger 10. The plunger 10 is slotted longitudinally from the center outwardly, as shown at 10a, for reducing the induction of eddy currents.

The proper contact pressure of the movable element 11 against the faces of the fixed contacts is imposed by a spring 14 secured at one end to the upper part of the strip 13 and at the other end to the end of a screw 15 which is fixed to and projects forwardly from the back of the casing. A spring 16 is secured to the lower end of the plunger 10 and to a sheet metal plate 17 which is fixed to the back of the casing. This spring exerts a downward pull upon the plunger 10 and supplements the force of gravity tending to hold the same in its lowest position. At the lower end of the plunger is secured a small plate 18 which projects toward the back of the casing into a cut-away portion 17a of the plate 17. The plate thus serves as a stop for the plunger in its lowest and highest positions. Fastened to the lower face of the plate 18 and insulated therefrom is a metal arm 19 which extends rearwardly and forms at its rear a yieldable contact adapted to engage a pair of vertically extending plates 20a and 20b spaced apart from each other and mounted upon an insulating block 20 which is secured to the side of the plate 17. The contacting element 19 is adapted to have soldered or otherwise connected thereto, a flexible lead 21.

The normal position of the plunger 10 during operation is such as to bring the two sides of the contacting element 11 in engagement with the elongated fixed contacts 5. In this position the contact 19 at the lower end of the plunger is in mid-position between the contacts 20a and 20b and out of engagement with both of them. When the plunger moves downwardly from its mid-position, the contact 19 engages contact 20b and when the plunger moves upwardly from mid-position, the contact 19 engages contact 20a. When the plunger is in its lowest position, as shown in Figs. 1 and 2, the outer ends of the contacting element 11 are in engagement with the outer fixed contacts 3 and thereby short-circuits all of the resistive conductors connected between the contacts 3 and 5. When the current in the coil 7 is such as to raise the plunger 10 against gravity and the pull of the spring 16 to mid-position, the two sides of the contacting element 11 will engage the fixed contacts 5. In this position only the resistive conductors connected between the outer set of contacts 3 are inserted in the circuit connected to the terminals 6 while the resistive conductors connected to the middle sets of contacts 3 are short-circuited. When the current in the coil 7 is sufficient to raise the plunger 10 to its upper position and cause the plate 18 to engage the upper stop, the central portion of the contacting element 11 is in engagement with the mid-portion of the middle set of contacts 3 and all of the resistant controlled by the plunger is inserted in the external circuit. By this form of construction, the distance of travel of the plunger and contacting element 11 is comparatively short by reason of the wide open V-form of the movable element. This small range of movement from the resistance-all-out position to the resistance-all-in position insures a pronounced change of resistance with a comparatively small movement of the plunger and consequently imposes an adequate corrective change of resistance upon comparatively small change of current in the solenoid coil. The contact engagement between the element 11 and the fixed contacts is a wiping contact with a minimum of frictional wear, while the spring 14 insures adequate and uniform contact pressure of both sides of the contact element 11 in all positions of the controlling element. Furthermore the weight of the movable parts is comparatively light, permitting quick response of movement to any change of current and the low inertia likewise permits the movable portion of the system to adjust itself quickly to its correct position under any conditions of operation.

Fig. 3 shows the connections and relationship of the complete controlling apparatus for regulating the voltage of a self-excited, constant potential, direct current generator. The generator armature 22 is shown supplying the mains 23 and having a field winding 24. From the positive terminal of the generator, a connection leads to a motor driven field rheostat 25 having a contact arm 25a driven by a direct current motor having an armature 26 and a pair of field windings 27, 28. These field windings are reversely wound and when one of these windings is excited, the motor rotates in one direction and when the other of these windings is excited, the motor rotates in the reverse direction. From a terminal of the rheostat 25 a connection extends to one terminal of the resistance device having the fixed contacts 3 already described and from the other terminal of this device a connection extends to the field winding 24 of the main generator and to its negative terminal. The main field winding is therefore connected in series with the rheostat 25 and the solenoid controlled resistance device from the positive to the negative side of the line.

In Fig. 3 the parts already described with reference to Figs. 1 and 2 have been correspondingly numbered, the resistive conductors 3a connected between the contacts 3 and 5, being diagrammatically indicated. The solenoid coil 7 is connected from the positive side of the main generator through an adjustable resistance 29 and the winding 7 to the negative side of the line, the resistance 29 being for the purpose of adjusting the current in the winding 7 to a proper value. A relay 30 is shown for controlling a pair of movable contacts 31 and 32. The contact 31, when in its unattracted position, engages a fixed contact 31a and when in its attracted position, engages a fixed contact 31b. The contact 32, when in its attracted position, engages a fixed contact 32a. Another relay 33 controls a pair of movable contacts 34 and 35. The contact 34, when in its unattracted position, engages a fixed contact 34a; and the contact 35, when in its attracted position, engages the two contacts 35a and 35b. The winding of the relay 30 is connected from the positive side of the line to the contact 20a; and the winding of the relay 33 is connected from the positive side of the line to the contact 20b. The lead 21 extending from the movable contact 19 is connected to the negative side of the line. It is therefore apparent that when the plunger is above its mid-position and thereby causing contact 19 to engage contact 20a, the relay 30 will be energized; and when the plunger is below its mid-position, causing contact 19 to engage contact 20b, the relay 33 will be energized. The movable contact 31 of the relay 30 is connected to the negative side of the motor armature 26 which drives the regulating rheostat arm, while the movable contact 34 of the relay 33 is connected to the positive side of this armature. The movable contacts 32 and 35 of the two relays are connected to the negative side of the main generator. The fixed contacts 31a and 34a of the two relays are connected together. The fixed contact 31b is connected to the negative side of the main generator and the fixed contact 32a is connected to one terminal of the field winding 27, the other terminal of which is connected to the positive side of the armature 26. The fixed contact 35a is connected to one terminal of the field winding 28, the other terminal of which is connected to the positive side of the armature 26. The fixed contact 35b is connected to the negative terminal of the armature 26.

The electrical anti-hunting means is provided by connecting an adjustable resistance 36 to a point in the connection between the field winding 24 and the solenoid controlled resistance device, the other terminal of the resistance 36 being connected to the most positive side of the solenoid winding 7. It will be understood from the following description that any change in voltage drop in the resistance in series with the field winding 24 will affect the current in the resistance 36 and the potential of its terminals and thereby impose a counteracting impulse on the controlling winding 7, resulting from any change of the resistance in the field winding circuit.

The rheostat 25 is provided with a large number of steps, such as 200, with comparatively small changes in the amount of resistance between steps; but the resistance controlled by the solenoid is sub-divided into a comparatively small number of steps, such as a change of ten steps in moving from mid-position to top position and ten steps in moving from mid-position to the lowest position, the amount of resistance between steps being comparatively large. The parts are shown in Fig. 3 in their normal operating positions.

The operation will be understood by first assuming a fall in the voltage of the main generator, such as due to an increase of load on the mains 23. This decreases the current through the solenoid winding 7, permitting the spring or gravity to move the plunger downwardly from the mid-position shown and causing the contact element 11 to engage certain of the outermost contacts 3. This, of course, decreases the amount of resistance in the field circuit to a more or less considerable degree, depending upon the extent of the downward movement of the plunger. This, of course, increases the field strength of the main generator and thereby raises the voltage of the mains approximately to their normal voltage. In the meantime the contact 19, controlled by the plunger of the solenoid, has been brought into engagement with the contact 20b and thereby has energized the relay 33 by closing the circuit from the positive line through the relay and contacts 20b and 19 to the negative side of the line. The energizing of the relay 33 causes its contacts 34 and 35 to be raised and this movement of contact 35 closes a circuit from the positive main through the armature 26 to the negative main and also a circuit from the positive main through the field winding 28 to the negative main. This starts the pilot motor in such a direction as to turn the contact arm 25a of the rheostat in a direction to decrease the amount of its resistance in the field circuit, the direction of movement of the contact arm being counter-clockwise with the connections as shown in Fig. 3. The gradual reduction of this resistance tends to strengthen the field of the main generator and increase its voltage; but as this tendency to increase occurs, the current in the solenoid winding tends to increase and raise the plunger 10 and contactor 11 to reduce the amount of resistance in the field circuit controlled by the plunger. This action continues until the contact 19 has been raised sufficiently to disengage the contact 20b, at which time the contacting element 11 assumes its mid-position in engagement with the contacts 5. The disengagement of contacts 19 and 20b deenergizes the relay 33, permitting its movable contact 35 to break the circuits of the pilot motor and the contact 34 to engage its fixed contact 34a. This engagement causes the pilot motor to be quickly brought to rest by an electrical braking action due to the armature 26 being short-circuited by a circuit from the positive brush of the armature through contact 34, contact 34a, contact 31a, contact 31, and thence to the negative terminal of the armature. The result of this operation is that the solenoid first removes from the field circuit, one or more steps of its resistance of comparatively large amount and causes the pilot motor to adjust the amount of resistance in the field circuit to a comparatively fine degree, as may be required for the proper increase in field strength of the main generator for bringing its voltage close to its normal value. In the meantime the solenoid has automatically been restored to its normal mid-position in readiness for further response upon change of voltage of the main generator. Now assume that the voltage of the main generator increases due to a reduction of the load on the mains, or to any other cause. This increases the current in the solenoid winding and raises the contactor 11 to engage certain of the middle set of contacts 3. This increases the resistance in the field circuit and weakens the field of the main generator to reduce the voltage to near normal. In the meantime the contact 19 has engaged the contact 20a which closes the circuit of the relay 30 across the line. This raises the movable contacts 31 and 32 and closes the armature circuit of the pilot motor from the positive line through the contact 31 and contact 31b to the negative side of the line and likewise closes the field circuit of the winding 27 from the positive side of the line through the contacts 32a and 32 to the negative side of the line. This starts the pilot motor, but in view of its field being reversed from the condition previously considered, the motor rotates in the opposite direction and moves the contact arm 25a of the rheostat in a clockwise direction to gradually insert an additional amount of resistance of the rheostat in the field circuit. As the action continues, the current in the solenoid winding gradually decreases slightly until the contactor 11 has regained its mid-position in engagement with the contacts 5. The return of the plunger to its normal position has also caused the contact 19 to disengage contact 20a and deenergize the relay 30, causing its movable contacts to shift to the position shown in the drawings and deenergize the pilot motor. The engagement of the contact 31 with contact 31a places the armature of the pilot motor on a closed circuit from its positive terminal through contact 34, contact 34a, contact 31a and contact 31 to the negative terminal which results in bringing the motor quickly to rest. The rheostat 25 has now been adjusted to a proper value for maintaining the voltage of the main generator close to normal under the existent operating conditions. The apparatus is now in a condition to respond to any change of conditions, such as would disturb the voltage of the mains and is ready to act to restore the voltage to normal in the manner described.

The free response of the solenoid to any change of conditions might result in objectionable hunting owing to its comparatively low inertia and freedom of movement. This is prevented by the electrical anti-hunting means already described. If it be assumed that the plunger has dropped in response to the decrease of voltage more than would be necessary for correcting the voltage change, it is apparent that the resultant decrease of resistance in the field circuit will increase the voltage across the anti-hunting resistance 36 on account of the decreased drop in the resistance remaining in circuit with the field winding. The resultant increase in potential of the resistance 36 increases the potential at the point where this resistance is connected at the upper terminal of the solenoid winding 7, and thereby imposes an increased potential thereon which partially counteracts the decrease of current in the solenoid winding which initially caused its plunger to fall. In the same way, when the voltage of the mains increases and the plunger moves upwardly, the insertion of the increased amount of resistance in the field circuit reduces the potential imposed by the resistance 36 upon the upper terminal of winding 7 and thereby imposes a counter-acting impulse. It has been found in practice that this electrical anti-hunting action steadies the movement of the solenoid plunger and causes it to move smoothly to its proper adjusted positions without objectionable fluctuations and irregularity of movement.

Fig. 4 shows the invention applied to the control of a separately excited, alternating current generator for maintaining its voltage substantially constant. The armature 37 of the generator is indicated as supplying the three-phase mains 38; and the field winding 39 is shown as separately excited from constant potential direct current mains 40. The field circuit is shown as passing from the positive main 40 through the solenoid controlled resistance and then through the rheostat 25 to and through the field winding 39 back to the negative supply line 40. The current for controlling the solenoid is derived from a pair of the mains 38 directly, or through a transformer 41 when desirable for reducing the voltage. The secondary of the transformer is connected to a rectifier of suitable form, such as a bridge-connected type of copper-oxide rectifier 42. The solenoid winding is connected to the positive and negative terminals of this rectifier through an adjustable resistance 43. The anti-hunting resistance 44 is here shown as connected from a point between a terminal of the field winding and the rheostat 25 to the lower terminal of the solenoid winding, the upper terminal of this winding being connected to the positive supply line 40.

The operation as regards controlling the voltage of the mains 38 is similar to that described with reference to Fig. 3 and need not be repeated. The anti-hunting control will be understood by first considering an increase in voltage on the mains. This increases the current in the solenoid winding and raises its plunger to insert more resistance in the field circuit and reduces the potential of the upper terminal of the anti-hunting resistance 44 and thereby correspondingly reduces the potential applied by this resistance to the lower terminal of the winding 7, tending to counter-act to some degree, the initial increase of current in the winding 7. Similarly on a decrease of voltage of the mains 38 causing a decrease of current in the solenoid winding, the resulting decrease of the field resistance increases the potential of the upper terminal of the anti-hunting resistance 44 and results in raising the potential of the lower terminal of the winding 7 and thereby counter-acting, to some extent, the initial decrease of the current in this controlling winding.

Fig. 5 shows the invention applied to an alternating current generator having a separate exciter. The exciter armature 45 is shown supplying the field winding 39 of the main generator; and the exciter field winding 46 is subjected to the method and means of control already described for controlling the output of the exciter to the field winding of the main generator for maintaining its voltage approximately constant.

Fig. 6 is similar to Fig. 5 except that the anti-hunting means including the resistance 44 and its connections are omitted and replaced by a different form. In Fig. 6 a small transformer 47 is shown having a primary winding 47a connected in series in the field circuit of the exciter. The secondary winding 47b is connected in series with the solenoid winding 7. The core of this transformer is preferably provided with an air gap for keeping the inductance fairly constant and is designed so that it will be kept below the knee of the saturation curve. The secondary winding 47b is connected in series with the winding 7 in such direction as to give the proper counter-acting effect. Under normal conditions the flux in the core of the transformer remains constant by the direct current passing through the primary winding and no voltage is imposed upon the secondary winding by the transformer. When the voltage of the generator falls, the decreased current in the controlling winding 7 permits its plunger to move to a lower position and increases the exciter field current by removing a portion of the resistance 3a from the field circuit. The resulting increase in the field current causes a momentary increase of current through the primary winding 47a which results in a momentary increase of the current in the secondary winding 47b. This winding is connected in such direction in relation to the winding 7 as to impose an aiding momentary voltage in the circuit of the winding 7, tending to counter-act and dampen the downward movement of its plunger. This action is merely transitory and secures a desirable anti-hunting effect. Upon an increase of the voltage of the main generator above normal, the plunger of winding 7 is raised and results in decreasing the current in the field circuit of the exciter which decrease affects the transformer 47 to cause a momentary voltage to be imposed upon the secondary winding 47 in the reverse direction from that previously considered resulting in applying an opposing voltage in the circuit of the winding 7 and thereby tending to momentarily counter-act and check the upward movement of the plunger. Thus the anti-hunting effect is secured when the voltage of the generator rises as well as when such voltage falls below normal.

Fig. 7 is similar to Fig. 3 except that the electrical anti-hunting means secured by the resistance 36 and its connections are replaced by mechanical anti-hunting means. In Fig. 7 the light spring 16 of Fig. 3 is replaced by a heavier and stiffer spring 48 and its lower end is connected to a piston 49 of a dash-pot which is movable within the fixed cylinder 49a. An adjustable screw 49b is located in the bottom of the cylinder for providing an adjustable air vent between the exterior and interior of the dash-pot. A light bag 50 of oil silk, rubber or other light material is provided for enveloping the dash-pot and spring and is secured at its upper end to the lower end of the plunger 10 for protecting the device from dust and moisture. The flexibility of the bag permits relative movement of the plunger with reference to the fixed portion 49a of the dash-pot. Upon movement of the plunger 10 in either direction in its controlling action, the dash-pot as connected to the stiff spring tends to dampen its action by the comparatively slow permissible movement of the piston of the dash-pot. This form of anti-hunting means may be applied to any of the other figures of the drawings in place of the damping means disclosed in the other figures, where the more sluggish action is not objectionable.

Although particular embodiments of the invention have been described, it will be understood that various modifications and applications thereof may be made without departing from the scope of the invention. Likewise the various disclosures in my above-mentioned application may be applied to the present invention where desirable to suit the particular requirements. Where the claims refer to controlling the field strength of the generator, it will be understood that this refers to indirect control, such as by controlling the field of a separate exciter, as well as to direct control of the field of the main generator.

Instead of making the contacting bar 11 of a wide open V form, it could be arc-shaped or of bow form, or of any other equivalent form to secure the same results and the description in the claims as to the bar being of a wide open V form is to be understood as covering such equivalents. The contact bar may sometimes be made a straight bar and the contacts arranged in a wide open V form and thereby secure the same results in obtaining a pronounced change of resistance with a comparatively small relative movement, as more fully explained in my said prior pending application.

I claim:

1. Electric apparatus for controlling the voltage of a generator comprising an adjustable rheostat for controlling the field strength of the generator, a motor for adjusting said rheostat, a plurality of auxiliary resistance elements for also controlling the field strength of the generator, an electromagnet responsive to change of voltage of the generator adapted to move its movable element from its mid-position for increasing and decreasing respectively the number of said resistance elements in series with said rheostat, means controlled by said electromagnet for actuating said motor in one direction upon increasing the number of said resistance elements in series with said rheostat and for actuating the motor in the opposite direction upon decreasing the number of said resistance elements in series with said rheostat, and circuit connections controlled by said means for electrically braking said motor when said movable element is in its mid-position.

2. Electric apparatus for controlling the voltage of a generator comprising an adjustable rheostat for controlling the field strength of the generator, a motor for adjusting said rheostat, a plurality of auxiliary resistance elements for also controlling the field strength of the generator, an electromagnet responsive to change of voltage of the generator adapted to move its movable element from its mid-position for increasing and decreasing respectively the number of said resistance elements in series with said rheostat, a relay controlled by said electromagnet for actuating said motor in one direction upon increasing the number of said resistance elements in series with said rheostat, a second relay controlled by said electromagnet for actuating said motor in the opposite direction upon decreasing the number of said resistance elements in series with said rheostat, and means controlled by said relays for electrically braking said motor when said movable element is in its mid-position.

3. Electric apparatus for controlling the voltage of a generator comprising an adjustable rheostat for controlling the field strength of the generator, a motor for adjusting said rheostat, a plurality of auxiliary resistance elements for also controlling the field strength of the generator, an electromagnet responsive to change of voltage of the generator adapted to move its movable element from its mid-position for increasing and decreasing respectively the number of said resistance elements in series with said rheostat, means controlled by said electromagnet for actuating said motor in one direction upon increasing the number of said resistance elements in series with said rheostat and for actuating the motor in the opposite direction upon decreasing the number of said resistance elements in series with said rheostat, and electrical anti-hunting means connected to the circuit of said resistance elements for opposing change of position of said movable element.

4. Electric apparatus for controlling the voltage of a generator comprising an adjustable rheostat for controlling the field strength of the generator, a motor for adjusting said rheostat, a plurality of auxiliary resistance elements for also controlling the field strength of the generator, an electromagnet responsive to change of voltage of the generator adapted to move its movable element from its mid-position for increasing and decreasing respectively the number of said resistance elements in series with said rheostat, means controlled by said electromagnet for actuating said motor in one direction upon increasing the number of said resistance elements in series with said rheostat and for actuating the motor in the opposite direction upon decreasing the number of said resistance elements in series with said rheostat, and electrical anti-hunting means responsive to change of the controlling resistance for opposing change of position of said movable element.

5. Electric apparatus for controlling the voltage of a generator comprising an adjustable rheostat for controlling the field strength of the generator, a motor for adjusting said rheostat, a plurality of auxiliary resistance elements for also controlling the field strength of the generator, an electromagnet responsive to change of voltage of the generator adapted to move its movable element from its mid-position for increasing and decreasing respectively the number of said resistance elements in series with said rheostat, means controlled by said electromagnet for actuating said motor in one direction upon increasing the number of said resistance elements in series with said rheostat and for actuating the motor in the opposite direction upon decreasing the number of said resistance elements in series with said rheostat, and an anti-hunting impedance device connected to the winding of said magnet and to the circuit containing said resistance elements for opposing change of position of said movable element.

6. Electrical apparatus for controlling the voltage of a generator comprising an adjustable rheostat connected in series in the field circuit of the generator, a motor for adjusting said rheostat, a resistive element also connected in series with said rheostat in the field circuit of the generator, said element having a plurality of contacts in a row adjoining each other with resistive conductors respectively connected between them, and a movable element normally engaging said row of contacts at an intermediate position, one of said elements having a wide open V contact form for obtaining a large change of engagement with said contacts with comparatively small movement of said element, an electromagnet responsive to increase of voltage of the generator for moving said movable element from said intermediate position to increase the number of said resistive conductors in series with said rheostat in the field circuit and in variable amounts according to the degree of increase of said voltage and upon decrease of the voltage of said generator for moving said movable element from said intermediate position to decrease the number of said resistive conductors in series with said rheostat in the field circuit and in variable amounts according to the degree of decrease of said voltage, and means controlled by said electromagnet for actuating said motor in a direction to increase the amount of resistance of said rheostat in the field circuit upon increasing the number of said resistive conductors in series with said rheostat and for actuating said motor in a direction to decrease the amount of resistance of said rheostat in series in the field circuit upon decreasing the number of said resistive conductors in series with said rheostat.

7. Electrical apparatus for controlling the voltage of a generator comprising an adjustable rheostat connected in series in the field circuit of the generator, a motor for adjusting said rheostat, a resistive element also connected in series with said rheostat in the field circuit of the generator, said element having a plurality of contacts in a row adjoining each other with resistive conductors respectively connected between them, and a movable element normally engaging said row of contacts at an intermediate position, one of said elements having a wide open V contact form for obtaining a large change of engagement with said contacts with comparatively small movement of said element, an electromagnet responsive to increase of voltage of the generator for moving said movable element from said intermediate position to increase the number of said resistive conductors in series with said rheostat in the field circuit and in variable amounts according to the degree of increase of said voltage and upon decrease of the voltage of said generator for moving said movable element from said intermediate position to decrease the number of said resistive conductors in series with said rheostat in the field circuit and in variable amounts according to the degree of decrease of said voltage, and an anti-hunting impedance device connected to the winding of said electromagnet and to the field circuit for opposing change of position of said movable element.

8. Electrical apparatus for controlling the voltage of a generator comprising an adjustable rheostat for controlling the field strength of the generator, a motor for adjusting said rheostat, an auxiliary adjustable resistance device connected in series with said rheostat and having a plurality of contacts in a row with resistive elements respectively connected between them and having a movable contact element normally engaging said row of contacts at an intermediate position for also controlling the field strength of the generator, an electromagnet for controlling the adjustment of said element responsive to change of voltage of the generator for moving said element from said intermediate position for increasing the number of said resistive elements of said device in series with said rheostat in varying amounts according to the degree of increase of said voltage and for moving said element from said intermediate position for decreasing the number of said resistive elements of said device in series with said rheostat in varying amounts according to the degree of decrease of said voltage, and means controlled by said electromagnet for actuating said motor in one direction upon increasing the amount of resistance of said device in series with said rheostat and for actuating the motor in the opposite direction upon decreasing the amount of resistance of said device in series with said rheostat.

9. Electrical apparatus for controlling the voltage of a generator comprising an adjustable rheostat for controlling the field strength of the generator, a motor for adjusting said rheostat, an auxiliary adjustable resistance device connected in series with said rheostat and having a plurality of contacts in a row with resistive elements respectively connected between them and having a movable contact element normally engaging said row of contacts at an intermediate position for also controlling the field strength of the generator, an electromagnet for controlling the adjustment of said element responsive to change of voltage of the generator for moving said element from said intermediate position for increasing the number of said resistive elements of said device in series with said rheostat in varying amounts according to the degree of increase of said voltage and for moving said element from said intermediate position for decreasing the number of said resistive elements of said device in series with said rheostat in varying amounts according to the degree of decrease of said voltage, a relay controlled by said electromagnet for actuating said motor in one direction upon increasing the amount of said resistance of said device in series with said rheostat, and a second relay controlled by said electromagnet for actuating said motor in the opposite direction upon decreasing the amount of resistance of said device in series with said rheostat.

FRANK G. LOGAN.